(12) United States Patent
Verilhac

(10) Patent No.: US 10,178,284 B2
(45) Date of Patent: Jan. 8, 2019

(54) DEVICE FOR ACQUIRING A CHARACTERISTIC IMAGE OF A BODY

(71) Applicants: Commissariat à l'Énergie Atomique et aux Énergies Alternatives, Paris (FR); ISORG, Grenoble (FR)

(72) Inventor: Jean-Marie Verilhac, Coublevie (FR)

(73) Assignees: Commissariat à l'Énergie Atomique et aux Énergies Alternatives, Paris (FR); ISORG, Grenoble (FR)

( * ) Notice: Subject to any disclaimer, the term of this patent is extended or adjusted under 35 U.S.C. 154(b) by 442 days.

(21) Appl. No.: 15/004,826

(22) Filed: Jan. 22, 2016

(65) Prior Publication Data

US 2016/0219196 A1 Jul. 28, 2016

(30) Foreign Application Priority Data

Jan. 23, 2015 (FR) .................... 15 50539

(51) Int. Cl.
*H04N 5/225* (2006.01)
*G06K 9/00* (2006.01)
*H04N 7/18* (2006.01)
*G02F 1/17* (2006.01)
*G01K 11/12* (2006.01)
*G02F 1/01* (2006.01)

(52) U.S. Cl.
CPC .......... *H04N 5/2253* (2013.01); *G01K 11/12* (2013.01); *G02F 1/0147* (2013.01); *G02F 1/178* (2013.01); *G06K 9/0004* (2013.01); *H04N 7/18* (2013.01)

(58) Field of Classification Search
CPC ......... G06K 19/0718; G06K 19/07354; G06K 9/0008; H04N 21/4415; H04L 29/06809
See application file for complete search history.

(56) References Cited

U.S. PATENT DOCUMENTS

| 4,394,773 | A | | 7/1983 | Ruell | |
| 5,942,761 | A | * | 8/1999 | Tuli | ................... G06K 7/10722 250/556 |
| 2011/0242349 | A1 | * | 10/2011 | Izuha | ................ H01L 27/14621 348/222.1 |
| 2014/0232912 | A1 | | 8/2014 | Morimoto | |
| 2015/0049330 | A1 | | 2/2015 | Aliane et al. | |

FOREIGN PATENT DOCUMENTS

EP 2818919 A1 12/2014

OTHER PUBLICATIONS

Search Report, dated Aug. 3, 2015, from a corresponding French Application No. 15/50539.
Young et al.: "Broad-wavelength-range chemically tunable block-polymer photonic gels," Nature Materials, vol. 6, No. 12, 2007, pp. 957-960.

* cited by examiner

*Primary Examiner* — Nelson D. Hernández Hernández
(74) *Attorney, Agent, or Firm* — Wolf, Greenfield & Sacks, P.C.

(57) ABSTRACT

A device for acquiring a characteristic image of a body, including: an image sensor including a plurality of photosensitive cells; and a layer of a material having its color varying according to a physical parameter characteristic of said body, coating a surface of the sensor.

15 Claims, 2 Drawing Sheets

DEVICE FOR ACQUIRING A CHARACTERISTIC IMAGE OF A BODY

CROSS-REFERENCE TO RELATED APPLICATIONS

This application claims the priority benefit of French patent application number 15/50539, filed on Jan. 23, 2015, the contents of which is hereby incorporated by reference in its entirety to the maximum extent allowable by law.

BACKGROUND

The present application relates to the acquisition of a characteristic image of a body. It more particularly relates to the acquisition of an image representative of the patterns formed by the ridges and grooves of the skin of a finger or of any other portion of the human body (fingerprint, palm print, footprint, etc.), but may more generally relate to other applications, as explained in further detail at the end of the present description.

Discussion of the Related Art

Various devices and methods have been provided to perform an electronic acquisition of a fingerprint that is, to provide an electronic image representative of the patterns formed by the ridges and grooves of the skin of a finger.

Optical sensors, that is, sensors comprising a plurality of identical or similar elementary photosensitive acquisition cells (or pixels) formed inside and/or on top of a substrate, have in particular been provided, each cell generally comprising a photoelectric conversion element and one or a plurality of transistors for controlling this element.

In particular, optical sensors where the sensor surface is substantially identical to the surface of the print to be acquired, and where no magnifying or reducing focusing (lens) or refracting (prism-based system) optical system is placed between the sensor pixels and the body for which an image is desired to be acquired, have been provided. Sensors of this type have the advantage of being relatively thin due to the absence of an optical system, and of accordingly being easily integrable in many devices. Such sensors, which will be called "flat" sensors hereafter, may for example be made in CMOS technology, the pixels then being formed inside and on top of a semiconductor substrate, for example, made of silicon. However, due to the relatively large surface area of such sensors, their manufacturing in CMOS technology is expensive. Thus, in many applications, it is preferred to use flat sensors made in TFT technology (Thin Film Transistor), that is, where the pixels are formed on a support substrate made of a relatively low-cost material, for example, glass, by successive depositions of conductive layers, of insulating layers, and of semiconductor layers, on the support substrate.

Conventionally, in a phase of acquisition of an image representative of a fingerprint by means of a flat sensor, the user places his/her finger on a surface of the sensor, for example, the surface having the pixels arranged on its side, and the sensor is illuminated from its opposite surface by means of a light source. Light emitted by the source crosses transparent areas of the assembly formed by the substrate and the pixels. The light is then back-scattered by the finger towards the photoelectric conversion elements of the sensor with, at the level of each pixel, an attenuation of variable magnitude according to whether the skin portion located above the cell corresponds to a ridge or to a groove of the finger skin. As a variation, the light source may be placed next to the finger, particularly if the substrate is non-transparent, in which case the light can then be conveyed towards the finger surface by a planar waveguide located between the pixels and the finger. The image of the print is acquired by the sensor while the user's finger is positioned on the sensor, after which the user removes his/her finger at the end of the acquisition.

Generally, a problem which arises in this type of sensor is that the presence of the user's finger at a short distance from the sensor pixels during the acquisition makes it difficult to illuminate the finger without directly illuminating, at the same time, the sensor pixels. The parasitic light which reaches the sensor pixels without having touched by the finger then generates a background light noise which degrades the sensor detection performance.

SUMMARY

Thus, an embodiment provides a device for acquiring a characteristic image of a body, comprising: an image sensor comprising a plurality of photosensitive cells; and a layer of a material having its color varying according to a physical parameter characteristic of the body, coating a surface of the sensor.

According to an embodiment, the parameter is a parameter from the group comprising the temperature of the material, the pressure applied to the material, the moisture content of the material, the pH of a fluid applied on the material, and the concentration of a chemical or biological marker applied on the material.

According to an embodiment, the material is a thermochromic ink, for example, based on thermochromic liquid crystals or based on leuco dye.

According to an embodiment, the sensor comprises a substrate having the photosensitive cells arranged inside and/or on top of it.

According to an embodiment, the layer is arranged on the side of the surface of the substrate comprising the photosensitive cells.

According to an embodiment, the layer is arranged on the side of the surface of the substrate opposite to the photosensitive cells.

According to an embodiment, each photosensitive cell comprises a single photodetector and at least one transistor for controlling the photodetector.

According to an embodiment, each photosensitive cell comprises a plurality of photodetectors sensitive in different wavelength ranges, and at least one transistor for controlling the photodetectors.

According to an embodiment, the layer is discontinuous, and is only located opposite the photosensitive cells of the sensor.

Another embodiment provides a method of using a device of the above-mentioned type, comprising the successive steps of: placing the body for which an image is desired to be acquired in contact or almost in contact with the layer; removing the body from the layer; and acquiring an image of the layer by means of the sensor.

According to an embodiment, the body is a skin portion of a portion of the human body, for example, a portion of the skin of a finger.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
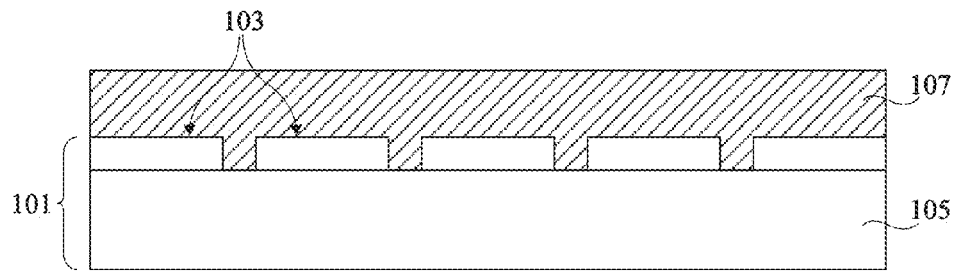
FIG. 1 is a cross-section view schematically showing an embodiment of a fingerprint electronic acquisition device.

For clarity, the same elements have been designated with the same reference numerals in the various drawings and, further, the various drawings are not to scale. Further, in the following description, unless otherwise mentioned, directional references such as "upper", "lower", "topping", "above", etc., apply to devices oriented as illustrated in the corresponding views, it being understood that, in practice, the devices may have different orientations.

FIG. 1 is a cross-section view schematically showing an embodiment of a fingerprint image electronic acquisition device.

The device of FIG. 1 comprises an optical sensor 101, comprising a plurality of identical or similar elementary photosensitive acquisition cells 103, or pixels. Pixels 103 are arranged inside and/or on top of a support substrate 105 of the sensor. Substrate 105 may be transparent or opaque. As an example, substrate 105 is an insulating substrate, for example, a glass or plastic substrate, and pixels 103 are made in TFT technology on the upper surface of substrate 105. As a variation, substrate 105 is a semiconductor substrate, for example, made of silicon, and pixels 103 are made in CMOS technology inside and on top of substrate 105, on the upper surface side of substrate 105.

Each pixel 103 for example comprises one or a plurality of photoelectric conversion elements, and one or a plurality of transistors for controlling this element. The photoelectric conversion element or photodetector may be a photodiode, for example, a PN junction photodiode or a PIN-type photodiode (pinned photodiode) or, more generally, any element capable of converting a light radiation into an electric signal, for example, a phototransistor, a photoresistor, an organic photodiode, etc. Each pixel may further comprise a lens capable of focusing the light received by the pixel onto the photoelectric conversion element of the pixel.

Pixels 103 are for example arranged in an array along rows and columns. The pitch between pixels of sensor 101 is for example in the order of 50 µm, for example, in the range from 30 to 70 µm, it being understood that the described embodiments are not limited to this specific example.

In this example, sensor 101 is a flat optical sensor of the above-mentioned type, that is, of the type capable of acquiring an image of a fingerprint with no magnifying or reducing lens and with no prism-based refracting optical system between the sensor pixels and the finger, an image of which is desired to be acquired. In top view, the surface of sensor 101 is for example of the same order of magnitude as the surface of the print to be acquired.

It should be noted that the forming of sensor 101, and, more particularly, of pixels 103 of sensor 101, has not been detailed in the present application, the described embodiments being compatible with most existing image sensor structures.

According to an aspect of an embodiment, the device of FIG. 1 comprises a layer 107 made of a material having its color varying according to a physical parameter characteristic of the body for which an image is desired to be acquired, that is, in the case in point, the finger skin. As an example, layer 107 is a layer of a thermochromic material, that is, a material having its color varying according to its temperature. In the example of FIG. 1, layer 107 coats the upper surface of sensor 101.

Figure 2A:
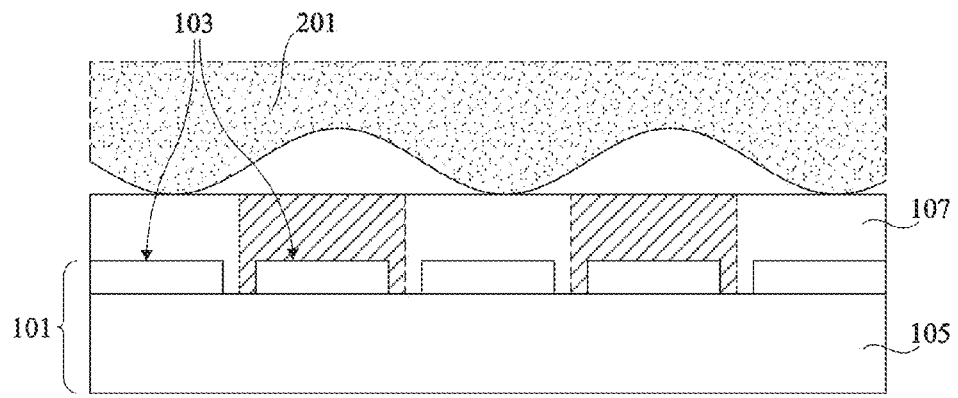
FIGS. 2A, 2B, and 2C are cross-section views schematically showing an example of a method of acquiring an image of a fingerprint by means of the device of FIG. 1.
Figure 2B:
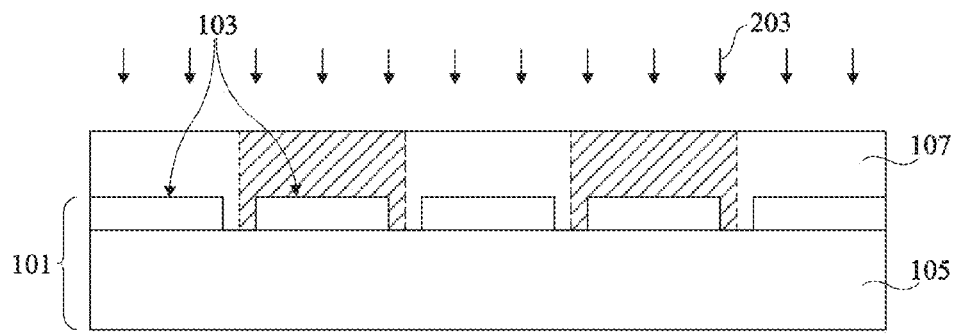
Figure 2C:
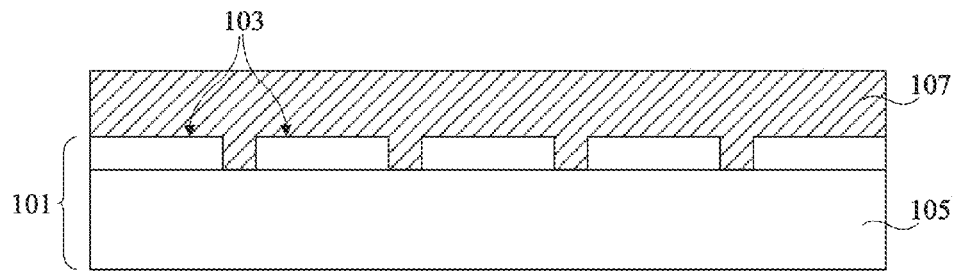

FIGS. 2A, 2B, and 2C are cross-section views illustrating the development of a phase of fingerprint image acquisition by means of the device of FIG. 1.

In a first step, illustrated in FIG. 2A, the user places his/her finger 201 in contact or almost in contact with the upper surface of layer 107, for example, less than 1 mm away from the upper surface of layer 107. As a result, the color of layer 107 varies, due to the heating of the layer by the finger. The temperature of layer 107, and thus the color taken by layer 107, is different in the areas of layer 107 opposite ridges of the finger skin, and in the areas of layer 107 opposite grooves of the finger skin. Thus, the pattern formed by the ridges and grooves of the finger skin is transcribed as a colored (or dark and light) pattern on layer 107. The time of application of the finger in contact or almost in contact with layer 107 may be adjusted according to the nature of layer 107, to obtain a good transcription of the fingerprint pattern on layer 107.

In a second step illustrated in FIG. 2B, the user removes his/her finger from the device. The colored pattern developed on layer 107 during the first step then remains for a certain remanence period which depends on the nature of layer 107. An image of the colored pattern developed on layer 107 is then acquired by sensor 101 during the remanence period. Layer 107 is preferably formed to have a remanence period compatible with the duration of acquisition of an image by sensor 101. As an example, layer 107 has a remanence period in the range from 1 ms to 300 s, and preferably in the range from 100 ms to 5 s.

During the image acquisition, the user's finger no longer being located above the sensor, the sensor may be illuminated via the upper surface of the device, as illustrated by the arrows bearing reference 203 in FIG. 2B. The sensor illumination light should then cross layer 107 to reach the sensor pixels. In practice, in many configurations, the ambient light may be sufficient to acquire an image of the pattern of the print via sensor 101. However, if the ambient light flow is too low to allow the image acquisition, for example, if it is lower than 10 nW/cm2, the acquisition device may comprise a complementary illumination source arranged above layer 107.

After the acquisition, at the end of the remanence period, the colored pattern representative of the fingerprint disappears from layer 107, as illustrated in FIG. 2C. Layer 107 then for example recovers a uniform hue, which is a function of the ambient temperature.

Layer 107 is for example made of an ink based on thermochromic liquid crystals, that is, an ink having microcapsules filled with a liquid crystal having its color varying according to its temperature dispersed therein.

Generally, a thermochromic liquid crystal ink is black below a threshold temperature T1, and then progressively changes color by crossing the entire visible spectrum (generally, red, and then green, and then blue) between temperature T1 and a temperature T2 higher than temperature T1, and becomes black again above temperature T2.

Figure 3:
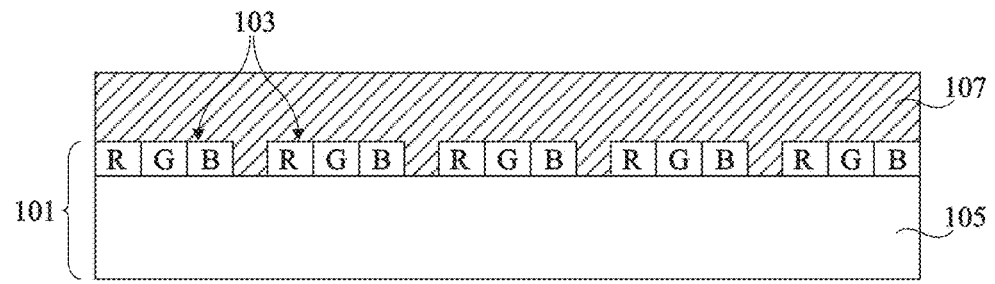
FIG. 3 is a cross-section view schematically showing an alternative embodiment of the device of FIG. 1.

In this case, each pixel 103 of sensor 101 preferably comprises a plurality of photodetectors sensitive in different wavelength ranges, as schematically illustrated in FIG. 3, where each pixel 103 comprises a photodetector sensitive to red (R), a photodetector sensitive to green (G), and a photodetector sensitive to blue (B). Each photodetector may comprise a specific colored filter defining its sensitivity range. Colored filters preferably are filters of small bandwidth, for example, smaller than 100 nm (in wavelength). The number of photodetectors and the respective sensitivity ranges of the photodetectors of each pixel 103 of the sensor may be adapted according to the type of ink used and to the desired detection accuracy. Further, the selection of the ink used may be subject to a compromise between the desired detection accuracy and the compatibility of the device with various finger temperature. Indeed, if temperature range T1-T2 where the color of layer 107 varies, also called bandwidth of layer 107, is narrow, the color variation between a ridge and a groove of the skin of a finger will be relatively marked, and may thus be relatively easily detected with a small number of photodiodes per pixel. However, since the device is only compatible with fingers having an average surface temperature between T1 and T2, the acquisition of certain prints risks being impossible. Conversely, if bandwidth T1-T2 of layer 107 is wide, the device will be compatible with fingers having various average temperatures, but the color variation between a ridge and a groove of the skin of a finger will be relatively lightly marked, and will require a larger number of photodetectors per pixel to be detectable with a good accuracy.

An alternative may comprise providing a plurality of acquisition devices comprising layers 107 having relatively narrow bandwidths, juxtaposed to cover a wide range of temperatures of use with a good accuracy, while keeping a limited number of photodetectors per pixel. In this case, during a print acquisition phase, a prior step of measuring the temperature of the user's finger may be provided, the user being then asked to position his/her finger on the device compatible with the measured temperature.

As a variation, layer 107 may be made of an ink based on a leuco dye, that is, an ink having microcapsules filled with a thermochromic leuco dye (generally in liquid form), that is, a dye having its molecules capable of passing from a colored form to a transparent form according to temperature. Generally, a leuco dye thermochromic ink is colored below a threshold temperature T1, and then becomes progressively transparent between a temperature T1 and a temperature T2, and remains transparent beyond temperature T2.

In this case, each pixel 103 of sensor 101 may comprise a single photodetector, the transmittance variations of layer 107 being transcribed on sensor 101 as grey level variations. Further, as previously, the selection of the bandwidth of the ink used may be subject to a compromise between the desired detection accuracy and the compatibility of the device with various finger temperatures. It should however be noted that the bandwidths of leuco dye thermochromic inks are generally much wider than the bandwidths of liquid crystal thermochromic inks.

As an illustration, the average surface temperature of a finger is generally in the range from 36 to 41° C., the temperature difference between a ridge and a groove of the skin of a finger at the upper surface level of the device may be in the range from 0.01 to 0.1° C., for example, in the order of 0.03° C., the bandwidth of a liquid crystal thermochromic ink may be in the range from 0.1 to 1° C., and the bandwidth of a leuco dye thermochromic ink may be in the range from 2 to 5° C.

For liquid crystal inks as well as for leuco dye inks, the dimensions of the microcapsules are preferably smaller than the dimensions of pixels 103 of sensor 101. As an example, the diameter of the microcapsules is at least 10 times smaller than the pitch between pixels of the sensor. As an example, the diameter of the microcapsules is in the range from 1 to 5 µm.

Layer 107 may for example be deposited by silk-screening, by inkjet printing, by spray coating, by spin coating, or more generally by any other known deposition method. As an example, the thickness of layer 107 is in the range from 1 to 100 µm.

A protection layer, not shown, may optionally coat the upper surface of layer 107. The protection layer is preferably relatively transparent to light, at the detection wavelength of sensor 101. Further, the protection layer is preferably sufficiently thin to avoid disturbing the transcription of the fingerprint pattern on layer 107. As a non-limiting example, the protection layer is a parylene layer, a silicon nitride layer, an alumina oxide layer, or a layer of a fluorinated polymer of CYTOP type. The protection layer for example has a thickness smaller than 1 µm, for example, in the order of 100 nm. The protection layer is for example deposited by atomic layer deposition (ALD), by chemical vapor deposition (CVD, PECVD), in liquid form, by evaporation, or, more generally, by any other known deposition method. This layer may have an isotropic or anisotropic thermal conductivity.

Further, sensor 101 may optionally comprise an encapsulation film, not shown, arranged between pixels 103 and layer 107, particularly to mechanically protect sensor 101 (for example, against shocks) and/or against the environment (humidity, . . . etc.).

Figure 4:
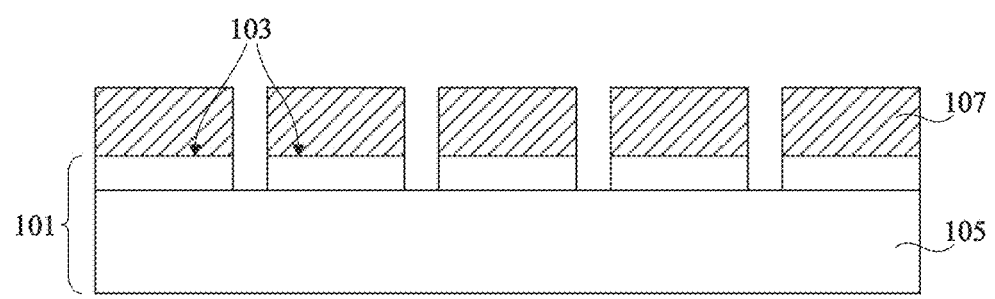
FIG. 4 is a cross-section view schematically showing another alternative embodiment of the device of FIG. 1.

FIG. 4 is a cross-section view schematically showing an alternative embodiment of a fingerprint acquisition device of the type described in relation with FIGS. 1 to 3.

In the example of FIG. 4, the acquisition device comprises the same elements as in the example described in relation with FIGS. 1 and 3, and differs from the example of FIGS. 1 and 3 in that, in the example of FIG. 4, layer 107 is not a continuous layer coating the entire surface of sensor 101, but is a discontinuous layer only coating pixels 103 or a portion of the surface of each pixel 103. In the example of FIG. 4, layer 107 may be deposited by any known method allowing a local deposition of the material forming it, for example, silk screening, inkjet printing, heliography, flexography, etc. As a variation, layer 107 may, first, be deposited over the entire surface of sensor 101, and then be locally removed, for example, between pixels 103, by any adapted local removal method, for example, by laser ablation, lithography, or photolithography followed by an etching, etc.

In the example of FIG. 4, the discretization of layer 107 into pads located on the pixels particularly enables to improve the spatial resolution of the image while limiting thermal diffusion between pixels.

Figure 5:
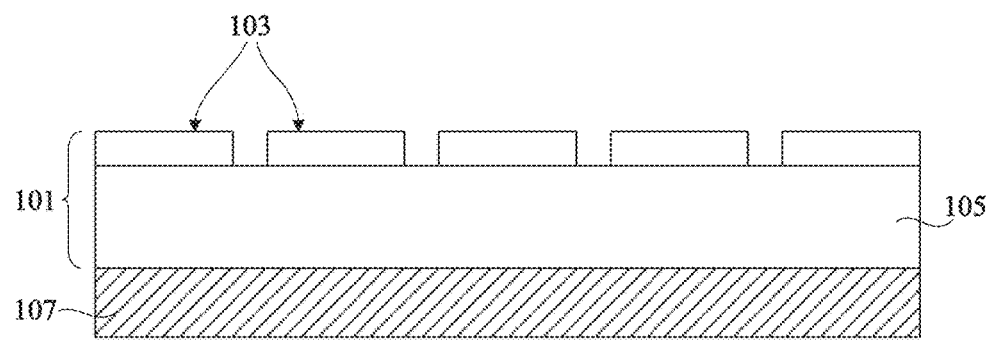
FIG. 5 is a cross-section view schematically showing another alternative embodiment of the device of FIG. 1.

FIG. 5 is a cross-section view schematically showing another alternative embodiment of a fingerprint acquisition device of the type described in relation with FIGS. 1 to 4.

The device of FIG. 5 differs from the examples described in relation with FIGS. 1 to 4 essentially in that, in the example of FIG. 5, layer 107 of variable color is arranged on the lower surface side of substrate 105, that is, on the side of substrate 105 opposite to pixels 103.

The operation of the device of FIG. 5 is similar or identical to that which has been previously described, except that, during a phase of acquisition of an image of a digital fingerprint, the user's finger (not shown) is placed on the lower surface of the device (in contact or almost in contact with the lower surface of layer 107) during the phase of transcription of the print pattern onto layer 107. During the actual acquisition of the image by sensor 101 (after the removal of the user's finger), the sensor is illuminated from its lower surface, the illumination light crossing layer 107 and substrate 105 to reach pixels 103. It should be noted that in this alternative embodiment, substrate 105 is selected to be transparent to the detection wavelengths of the device. As an example, substrate 105 is made of glass.

An advantage of the described embodiments is that they enable to form a particularly compact and easy-to-form acquisition device. In particular, the management of the sensor illumination is significantly simplified with respect to existing optical fingerprint sensors.

Specific embodiments have been described. Various alterations, modifications, and improvements will readily occur to those skilled in the art.

In particular, the described embodiments are not limited to the specific example of application described in relation with FIGS. 1 to 5, that is, the application to the acquisition of fingerprints. It will in particular be within the abilities of those skilled in the art to adapt the described embodiments to devices of acquisition of an image representative of patterns of the skin or of any other portion of the human body, for example, patterns of the palm of the hand, of the foot, etc. Further, the described embodiments are not limited to the acquisition of images characteristic of human body portions. For example, the described embodiments may be adapted to form a device of acquisition of an image representative of a signature, for example, thermal, of any type of body, for example, of an electronic device.

Further, the embodiments are not limited to the specific example described in relation with FIGS. 1 and 5 where layer 107 of variable color is a layer made of a thermochromic material. More generally the layer of variable color may be made of any material having its color varying, preferably reversibly, according to any physical parameter characteristic of the body for which an image is desired to be acquired. As an example, in the case of a fingerprint acquisition device, layer 107 may be made of a piezochromic material (for example, a piezochromic ink), that is, a material having its color varying according to the pressure which is applied thereto, or of a hydrochromic material (for example, a hydrochromic ink), that is, a material having its color varying according to its moisture content, or of a material having its color varying according to the pH of a fluid applied at its surface, or of a material having its color varying according to the concentration of a chemical or biological marker applied at its surface. All these physical parameters are indeed characteristic of the human skin, and their variations at the surface of layer 107 are capable of enabling to discriminate ridges from grooves of a finger skin, or more generally, to discriminate any types of structures of the skin of a portion of the human body.

Further, the described embodiments are not limited to the example described in relation with FIGS. 1 to 5 where sensor 101 is a flat sensor. It will be within the abilities of those skilled in the art to adapt the described embodiments to the case where sensor 101 comprises a magnifying or reducing optical system, for example, a lens, or a prism-based optical system, between the sensor pixels and layer 107.

Further, the described embodiments are compatible with rigid, flexible, or conformable substrates (105 in the shown examples).

The invention clamed is:

1. A device for acquiring a characteristic image of a body, comprising:
   an image sensor comprising a plurality of photo-sensitive cells; and
   a layer of a material having its color varying due to the variations of a physical parameter characteristic of said body, coating a surface of the sensor,
   wherein the sensor comprises a substrate having the photo-sensitive cells arranged inside and/or on top of it,
   and wherein the layer is arranged on the side of the surface of the substrate opposite to the photosensitive cells.

2. The device of claim 1, wherein said parameter is a parameter from the group comprising the temperature of the material, the pressure applied to the material, the humidity rate of the material, the pH of a fluid applied on the material, and the concentration of a chemical or biological marker applied on the material.

3. The device of claim 1, wherein said material is a thermochromic ink, for example, based on thermochromic liquid crystals or based on leuco dye.

4. The device of claim 1, wherein each photosensitive cell comprises a single photodetector and at least one transistor for controlling the photodetector.

5. The device of claim 1, wherein each photosensitive cell comprises a plurality of photodetectors sensitive in different wavelength ranges, and at least one transistor for controlling the photodetectors.

6. A device for acquiring a characteristic image of a body, comprising:
   an image sensor comprising a plurality of photo-sensitive cells; and
   a layer of a material having its color varying due to the variations of a physical parameter characteristic of said body, coating a surface of the sensor;
   wherein the layer is discontinuous and is located only opposite the photosensitive cells of the sensor.

7. The device of claim 6, wherein said parameter is a parameter from the group comprising the temperature of the material, the pressure applied to the material, the humidity rate of the material, the pH of a fluid applied on the material, and the concentration of a chemical or biological marker applied on the material.

8. The device of claim 6, wherein said material is a thermochromic ink, for example, based on thermochromic liquid crystals or based on leuco dye.

9. The device of claim 6, wherein the sensor comprises a substrate having the photo-sensitive cells arranged inside and/or on top of it.

10. The device of claim 9, wherein the layer is arranged on the side of the surface of the substrate comprising the photosensitive cells.

11. The device of claim 9, wherein the layer is arranged on the side of the surface of the substrate opposite to the photosensitive cells.

12. The device of claim 6, wherein each photosensitive cell comprises a single photodetector and at least one transistor for controlling the photodetector.

13. The device of claim 6, wherein each photosensitive cell comprises a plurality of photodetectors sensitive in different wavelength ranges, and at least one transistor for controlling the photodetectors.

14. A method of using a device for acquiring a characteristic image of a body, the device comprising an image sensor comprising a plurality of photosensitive cells, and a layer of a material having its color varying due to the variations of a physical parameter characteristic of said body, coating a surface of the sensor, the method comprising the successive steps of:

placing the body for which an image is desired to be acquired in contact or almost in contact with the layer;

removing the body from the layer; and acquiring an image of the layer by means of the sensor.

15. The method of claim 14, wherein the body is a skin portion of a portion of the human body, for example, a portion of the skin of a finger.

* * * * *